Sept. 8, 1970  TADAO TOYOOKA ET AL  3,527,925
HEATER FOR USE WITH STORAGE BATTERY
Filed March 29, 1968                                2 Sheets-Sheet 2
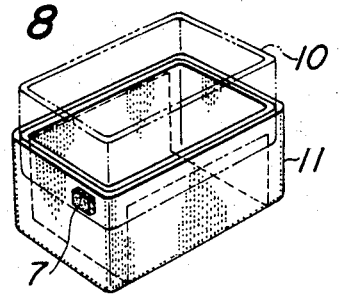
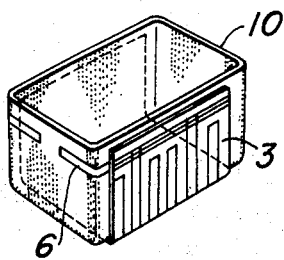
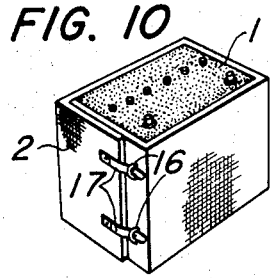
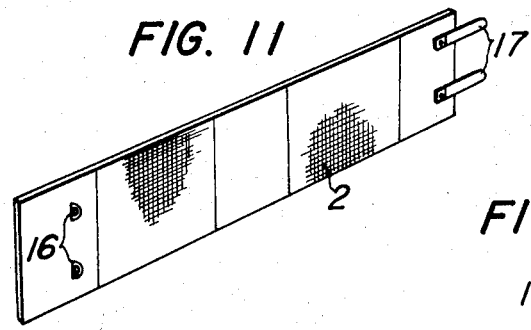
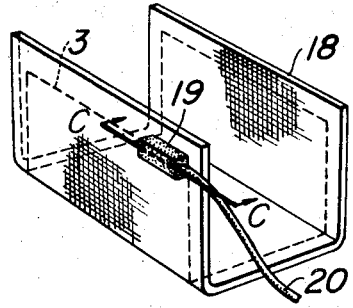
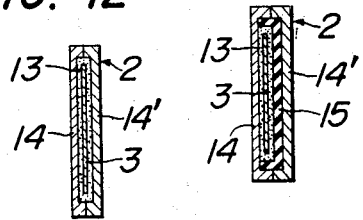
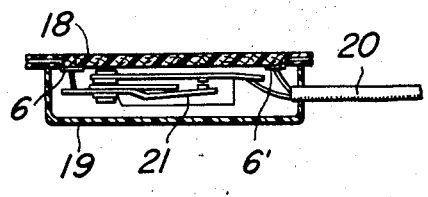
INVENTORS
TADAO TOYOOKA
TAKEO NISHIDA
BY
ATTORNEYS United States Patent Office 3,527,925
Patented Sept. 8, 1970

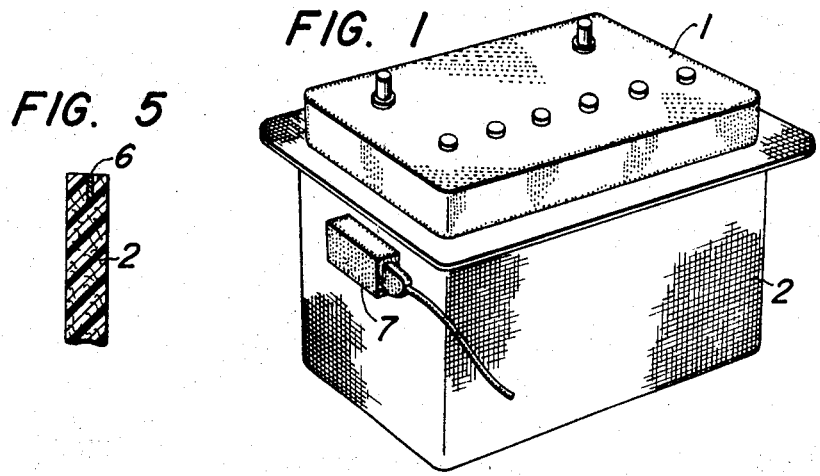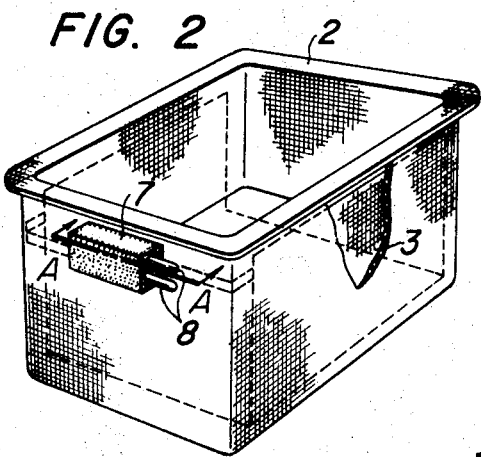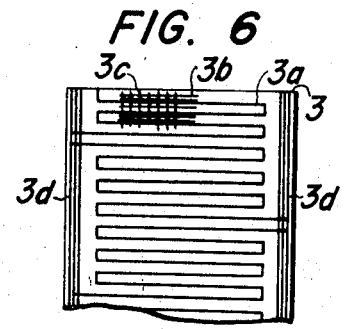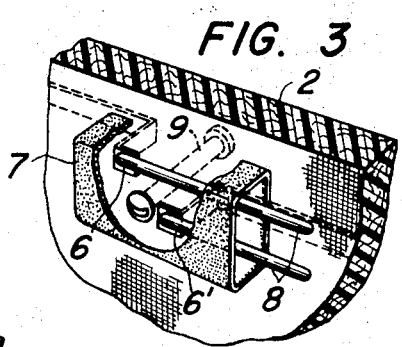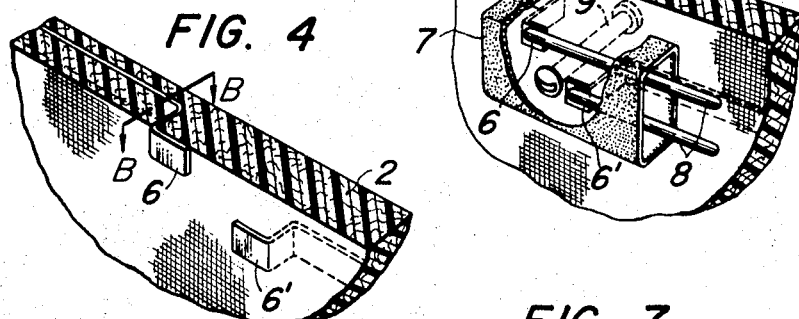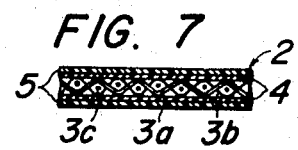

3,527,925
HEATER FOR USE WITH STORAGE BATTERY
Tadao Toyooka and Takeo Nishida, Toyonaka-shi, Japan, assignors to Matsushita Electric Industrial Co., Ltd., Osaka, Japan, a corporation of Japan
Filed Mar. 29, 1968, Ser. No. 717,311
Claims priority, application Japan, Oct. 14, 1967, 42/88,287, 42/88,288, 42/88,289
Int. Cl. H05b 3/06
U.S. Cl. 219—521         4 Claims

ABSTRACT OF THE DISCLOSURE

A heater for use with a storage battery, which is adapted for effectively heating the electrolyte contained in the storage battery and preventing the electromotive force from dropping due to a decrease in temperature of the electrolyte, thereby making it always possible to produce a constant electromotive force.

---

This invention relates to a storage battery, and more particularly it pertains to a heater used with such a storage battery.

Electromotive force of a storage battery is produced through a kind of chemical reaction, and therefore it is considerably decreased at a low temperature as in winter due to the fact that the temperature of the storage battery itself, especially the temperature of the electrolyte is decreased under the influence of the low ambient temperature. More specifically, the reaction velocity of the electrolyte depends upon temperature, and especially at low temperatures it is lowered so that the electromotive force is decreased. With the electromotive force at 20° C. as 100, for example, that at −15° C. becomes as low as 50.

By heating the storage battery when the temperature is low as in winter, the electrolyte is not affected by the low ambient temperature. Thus, it is possible to prevent the electromotive force from dropping at low temperatures, so that a constant electromotive force is always produced to advantage.

In view of this, attempts have heretofore been made to use a heater for the purpose of heating a storage battery.

In the prior art, however, employment was made of such a technique as to embed a heater element in a battery casing or to place a storage battery on a flat heating plate incorporating a heater element to thereby heat the battery.

The technique of embedding a heater element in a battery casing is disadvantageous in that much trouble is experienced in the formation of the battery casing or the battery casing per se must be replaced if the heater element is partly damaged. The latter technique, or the technique of placing the storage battery on a flat heating plate has such drawbacks as that the thermal efficiency is low since heating is effected with respect to the bottom face of the battery only, and that heat loss is great since the heat conduction is effected through the laminated mass so that considerable time as well as high power is required to elevate the temperature of the electrolyte to a desired value. Thus, this technique is by no means an effective method of heating a battery.

Accordingly, a primary object of this invention is to provide a heater for use with a storage battery, comprising a heater element embedded in a resin, thereby efficiently heating the electrolyte from the peripheral faces of the storage battery body and thus preventing a decrease in electromotive force.

Other objects, features, advantages of this invention will become apparent from the following description taken in conjunction with the accompanying drawings, in which:

FIG. 1 is a perspective view showing a storage battery as being heated by a heater according to the present invention;

FIG. 2 is a partly broken perspective view showing the heater according to the present invention;

FIG. 3 is a fragmentary perspective view showing an attachment plug provided on the heater of the present invention;

FIG. 4 is a perspective view showing a lead wire portion, taken in section along the line A—A of FIG. 2;

FIG. 5 is a sectional view taken along the line B—B of FIG. 4;

FIG. 6 is a front view showing a face heater element incorporated in the heater according to the present invention;

FIG. 7 is an enlarged view showing a portion of the heater according to the present invention;

FIG. 8 is a perspective view illustrating an example of the method of forming the heater according to the present invention;

FIG. 9 is a perspective view showing the inner casing prior to the formation of the heater as shown in FIG. 8;

FIG. 10 is a perspective view showing the state in which a storage battery is heated by a heater which is different in form from the heater according to the present invention;

FIG. 11 is a perspective view showing the heater as shown in FIG. 10;

FIG. 12 is a sectional view of the heater as shown in FIGS. 10 and 11;

FIG. 13 is a sectional view showing an example of a heater which is different from that shown in FIG. 12;

FIG. 14 is a perspective view showing a heater provided with a thermostat; and

FIG. 15 is a sectional view taken along the line C—C of FIG. 14.

Referring to FIGS. 1 to 7, the reference numeral 1 represents a storage battery body, and 2 a heater accommodated on the storage battery body for the purpose of heating the latter. The heater 2 consists of a face heater element 3 serving as base member impregnated with a synthetic resin 5 and configured into the form of a top open box.

The aforementioned face heater element 3 serving as the base member is formed as follows. That is, when heat-resisting wefts 3b and warps 3c are woven into a cloth, a heater wire 3a is woven together with the wefts 3b in a zig-zag manner in the center of the cloth, and also lead wires 3d having substantially the same expansion and contraction ratios as those of the heater wire 3a are woven together with the warps 3c at opposite edges of the cloth. The heater wire 3a is connected with the lead wires 3d to provide a desired capacity. Furthermore, in the formation of the heater 2 with a resin, reinforcement member 4 such as a heat-resisting cloth or mat is provided on opposite sides of the face heater element 3 for the purpose of reinforcement. A heat insulator such as glass fibers or the like may be attached to the outer face of the face heater element 3 to prevent heat from being dissipated from the face heater element 3, so that heat loss of the face heater element 3 can be completely prevented. Structurally, it is advantageous to dispose the heat insulator outside the reinforcement member and make them integral with each other by the use of resin.

Detailed description will now be made of the method of treating the attachment plug for power source and lead wires.

Lead wires 6 and 6' such as copper foils or the like connected with the ends of the lead wires 3d provided at the opposite sides of the face heater element 3 are extended as far as the mounting portion of the attachment plug 7 provided on the box-like heater 2. In this case, the lead wires 6 and 6' are not exposed at the surface of the heater 2 but completely embedded in the heater 2 except for those of their portions which are associated with the mounting portion 7. These lead wires 6 and 6' have their terminating end portions each about 10 mm. in length projecting from the surface of the resin 5, as shown in FIG. 4. This can be achieved by setting the lead wires 6 and 6' in this way prior to the molding of the resin.

The power source attachment plug is attached to those end portions of the lead wires 6 and 6' projecting from the resin surface. The lead wires 6 and 6' can be completely connected with plug inserts 8 by disposing the latter in contact with the exposed portions of the lead wires 6 and 6' and fixing the plug 7 to the heater 2 by locking means such as a bolt and nut. The surface of contact between the heater 2 and the attachment plug 7 is completely sealed with an adhesive agent or the like.

Although, in the foregoing, description has been made of the case where the box-like heater 2 is formed by previously superimposing the face heater element 3, reinforcement member 4 and heat insulator upon each other and coating them with the resin 5, the present invention is by no means restricted to such method. A method such as shown in FIGS. 8 and 9 is also conceivable. In such method, the heater 2 is composed of an inner casing 10 and outer casing 11 which are formed by molding a resin. More specifically, the box-like heater 2 is formed by simply adhering the face heater elements as shown in FIG. 6 to the outer bottom surface and opposite outer side surfaces of the inner casing 10 previously, then fitting the outer casing thereon, and thereafter either thermally compressing the whole or adhering them to each other with an adhesive agent.

In this case, it is not necessarily required that the inner casing 10 be configured in a similar box-like shape to that of the outer casing 11. The inner casing 10 may be formed in a channel shape with side surfaces having no face heater element applied thereon. By the above method, the heater 2 can be readily produced. And yet, such heater can be easily formed of a plate-like thermoplastic material. Furthermore, the face heater element 3 can be easily located in the center of the width of the resin layer, and thus excellent water-resisting property and electrical insulaton can be realized.

Although in the examples as shown in FIGS. 1 and 2 and FIGS. 8 and 9 the heater 2 was configured in box-like shape, it is also possible that the heater may be formed in a channel like shape in which only the walls having the face heater element 3 embedded therein are present and opposite side walls are absent. Such a configuration leads to rationalization of the manufacturing steps and savings of material.

Description will now be made of a third example of the heater embodying the present invention, with reference to FIGS. 10 to 13.

In the respective examples described hereinbefore, the heater 2 has been described and illustrated as being configured in a box-like or similar shape. In the case of the present embodiment, the heater 2 is of band-like shape and it can be wrapped on the peripheral surface of the storage battery body 1.

More specifically, the face heater element 3 is sandwiched between two synthetic resin films 13 and then these films are bonded to each other either thermally or with a bonding agent. Preferably, the resin films 13 are thermo-plastic resin films, so that they may be used for any desired dimensions of storage battery. The face heater element 3 held between the bonded resin films 13 is enclosed in two sheets of cloth 14 and 14', as shown in FIG. 12. In this case, the heating ability of the heater 2 can be improved by forming one of the cloth sheets or 14 of a good heat insulating material and the other cloth sheet 14' of a good heat conductor material. Preferably, use is made of glass fibers as good heat insulating material, and of metal foil as good heat conductor material, for example. In order to further improve the heating ability of the heater, the face heater element 3 held between the bonded resin films 13 may be enclosed in the cloth sheets 14 and 14' through a heat insulator 15 provided on one side. Thus, heat dissipation can be prevented so that the thermal efficiency will be enhanced.

Clamping buckle members 16, 16' and 17, 17' are attached to the end portions of the band-like heater 2 formed in the above manner. The heater 2 is wound on the outer periphery of the storage battery body 1 and clamped thereto by means of the members 16, 16' and 17, 17'.

In respect of versatility such band-like heater 2 is advantageous over the aforementioned box-like one because the former can be applied to any dimensions of storage battery.

In the foregoing, major examples of the contraction according to the present invention have been described. Description will now be made of a further example of the heater which can be very effectively applied to a storage battery having a casing formed of a transparent material such as glass so that the electrolyte contained therein can be seen from the outside. If any of the foregoing heaters is applied to such storage battery, it is not possible to take advantage of the feature that the battery casing is transparent, despite the fact that in the case of such a battery, the electrolyte can be seen from the outside through the transparent casing. In order to be able to heat the battery without destroying the feature that the battery casing is transparent, it is required that the heater 2 per se be made transparent. A concrete example will now be described.

For warps and wefts, use is made of threads each formed by twisting 225 pieces of non-alkaline glass fiber 7 microns in diameter 1.7 times on an average. By weaving 30 pieces of such threads for the warps and wefts each at a length of 2.5 cm. and at the same time weaving fine metal wires as part of the wefts at uniform intervals, a white cloth is formed which in turn is subjected to heat treatment at 340° C. for 30 hours thereby burning and removing the binding agent applied to the glass fiber and then gradually cooled. Then the cloth has styrene monomer applied thereon and is afterwards embedded in transparent maleic acid phthalate polyester resin. To carry out the embedding method, preparation is first made for two sheets of tempered glass of a predetermined size on the molded surfaces of which is very thinly applied a parting agent such for example as polyvinyl alcohol. In applying the parting agent, care must be taken to remove cloudiness, stains and the like as by polishing the glass with the parting agent. A predetermined quantity of compound maleic acid phthalate polyester resin (trade name, non-saturated polyester No. 8009 or 8010 manufactured by Dainihon Ink Kagaku Kogyo Kabushiki Kaisha) is uniformly applied on the glass plates having the parting agent previously applied thereon, and subsequently styrene monomer is lightly sprayed onto the resin surfaces by means of a spray, thereby removing air bubbles present in the resin. In ten odd minutes, the resin starts to solidify. Approximately at the time when the resin becomes jellied, styrene is applied to the glass fiber cloth having said fine metal wires woven therein, then the glass fiber cloth is placed on the jellied resin, and thereafter a small quantity of maleic acid phthalate polyester resin is uniformly applied thereon. Subsequently, styrene is applied on the maleic acid phthalate polyester resin to remove air bubbles. Another glass plate on which is similarly applied maleic acid phthalate polyester resin is quietly placed on the glass fiber cloth in such a manner that the jellied resin is opposed to the cloth and no air bubbles are left. The unit is maintained under a pressure of 1 kg./cm.$^2$ until the inside resin becomes jellied, and thereafter it is heated at a temperature of 60 to 80° C. In 10 to 20 minutes, the unit is completely hardened. After having been hardened, the unit is subjected to natural cooling to 40° C., and then the tempered glass plates on the opposite sides are removed. Thus, a complete product is obtained.

The transparent member having a heater element embedded therein has as high a translucency (transparency) as 83%, since with the white glass fiber cloth having the luster characteristic of glass fiber being embedded in polyester resin, only the heater wire woven in the glass fiber cloth as part of the wefts is seen. The translucency (transparency) was measured at a wavelength of 600 millimicrons with the aid of a Beckman spectrophotometer. If it is only desired to be able to see the electrolyte contained in the storage battery from the outside, the transparency has not to be so high as the above value but it may be as low as 40%. Therefore, the method of producing the transparent member is by no means restricted to that described above, and a variety of modifications is possible.

(1) It is preferable that the glass fibers are twisted 1.7 times on an average at intervals of 2.5 cm., but they may be twisted 4 times.

(2) Although the density of the wefts and warps is an important factor which governs the transparency, it is not restricted to 30 pieces per 2.5 cm., but it may be in the range range of 25 to 60 pieces.

(3) The method of burning the binding agent applied to the glass fibers is disadvantageous in that the temperature should be above 300° C. to completely remove the binding agent while if the temperature is raised above 400° C. the glass fibers tend to be aged so as to become fragile. Hence, the temperature should be in the range of 300 to 400° C.

The use of the heater 2 thus formed makes it possible to heat the storage battery without destroying the features of glass in case the battery casing is formed of glass.

With the various types of heater described above, its saturation temperature is varied with a change in ambient temperature since it is used at the saturation temperature of the face heater element thereof. Thus, this leads to change in the temperature of the battery electrolyte to be heated. In this case, there may occur such situation that the temperature of the electrolyte is excessivly elevated with variations in ambient temperature. Obviously, such high temperature is undesirable since the vaporization or the like of the electrolyte is actively caused. In order to solve these problems, a thermostat may be provided as shown in FIGS. 14 and 15, thereby always maintaining the electrolyte at a constant temperature. In FIGS. 14 and 15, the reference numeral 18 denotes a heater, 19 a thermostat casing accommodating a thermostat 21 therein, 20 a power source cord, and 6 and 6' lead wires extending from the heater element 3. The method of treating the thermostat and heater lead wires may be similar to that of mounting the power source plug. That is, lead wires 6 and 6' such as copper foils from the face heater element are extended to the thermostat mounting portion, and about 10 mm. long end portions of these lead wires are taken out of the resin surface. These lead wires, thermostat lead wires and power source cord are connected with each other within the thermostat casing.

As described above, in accordance with the present invention, use is made of the face heater element 3 formed by weaving the heater wire 3a in the cloth. The heater wire 3a may be formed of either one of a conductive resistance metal wire, carbon fiber, thread having graphite, carbon or the like applied on the surface, etc.

As will be seen from the foregoing, the heater embodying the present invention is capable of efficiently heating the electrolyte contained in the storage battery and preventing the electromotive force from dropping due to a temperature decrease of the electrolyte, thereby making it always possible to produce a constant electromotive force. In addition, the heater according to the present invention is of simplified construction and is formed independently of the storage battery itself so that if damaged; it can be readily replaced with a new one. This constitutes an advantage in respect of handling. From the foregoing, it will be appreciated that the heater embodying the present invention is not only free from the difficulties encountered in conventional heaters of this type but possesses also novel features of its own.

What is claimed is:

1. An electrical heater for a storage battery, comprising: a laminated body, said laminated body being in the form of a rectangular box having an open top side whereby a storage battery case may be lowered into said body, said body comprising an inner woven cloth having weft and warp threads of electrically non-conductive material interwoven with an electrically conductive heater wire means, a heat-resistant reinforcing layer of material along the opposite sides of said cloth, lead wire means connected with said heater wire means and extending therefrom to outwardly of said body and forming electrical terminals at a location on an outer surface of said body, an electrical supply plug means having respective contact elements in contact with said terminals.

2. The heater of claim 1, said wire means comprising a first wire means woven in zig-zag fashion together with said weft threads throughout the body of said cloth and a second wire means interwoven with said warp threads only along opposite edges of the cloth, the second wire means being lead wires connecting said first wire means to said terminal means.

3. The heater of claim 1, including a synthetic resin impregnating the outer face of each said layer of reinforcing material.

4. The heater of claim 1, said plug means comprising a mounting means sealingly attached to said body, said mounting means forming a sealed enclosure for said terminals and contact elements.

References Cited

UNITED STATES PATENTS

| | | | |
|---|---|---|---|
| 2,418,792 | 4/1947 | Riggs | 136—161 |
| 2,626,971 | 1/1953 | Mansoff | 136—161 |
| 2,710,909 | 6/1955 | Logan et al. | 219—528 X |
| 2,804,533 | 8/1957 | Nathanson | 219—522 |
| 3,191,005 | 6/1965 | Cox | 219—528 |
| 3,272,900 | 9/1966 | Ryan et al. | 219—543 X |
| 2,884,509 | 4/1959 | Heath | 338—208 |
| 2,938,992 | 5/1960 | Crump | 219—528 |
| 3,290,807 | 12/1966 | Esaka | 219—545 X |
| 3,425,020 | 1/1969 | Toyooka et al. | 338—208 |

FOREIGN PATENTS 693,191 6/1953 Great Britain.

VOLODYMYR Y. MAYEWSKY, Primary Examiner

U.S. Cl. X.R.

136—166, 181; 219—528, 544, 545